United States Patent [19]
Yoshida

[11] 4,453,115
[45] Jun. 5, 1984

[54] DC MOTOR CONTROL SYSTEM

[75] Inventor: Noriyuki Yoshida, Nagoya, Japan

[73] Assignee: Brother Kogyo Kabushiki Kaisha, Nagoya, Japan

[21] Appl. No.: 397,577

[22] Filed: Jul. 12, 1982

[30] Foreign Application Priority Data

Jul. 21, 1981 [JP] Japan ................... 56-114022

[51] Int. Cl.³ .................................. H02H 9/02
[52] U.S. Cl. ......................... 318/434; 318/345 B; 361/31
[58] Field of Search ............ 318/139, 301, 309, 317, 318/326, 332, 345 B, 345 F, 432, 434, 6, 7; 361/24, 30, 31

[56] References Cited

U.S. PATENT DOCUMENTS

| | | | |
|---|---|---|---|
| 3,878,446 | 4/1975 | Brandt | 318/317 |
| 3,936,711 | 2/1976 | Gay | 318/317 |
| 4,037,145 | 7/1977 | Bailey et al. | 318/332 |
| 4,121,138 | 10/1978 | Flint et al. | 318/7 |
| 4,121,141 | 10/1978 | Frazee | 318/326 |
| 4,166,239 | 8/1979 | Nakatani | 318/434 |
| 4,195,254 | 3/1980 | Gurwicz et al. | 318/434 |
| 4,230,977 | 10/1980 | Nelson | 318/434 |
| 4,236,102 | 11/1980 | Warmbier et al. | 318/317 |
| 4,264,785 | 4/1981 | Jacobson | 318/317 |
| 4,337,424 | 6/1982 | Cap et al. | 318/317 |
| 4,345,190 | 8/1982 | Horiuchi et al. | 318/332 |

Primary Examiner—G. Z. Rubinson
Assistant Examiner—Arthur G. Evans
Attorney, Agent, or Firm—Moonray Kojima

[57] ABSTRACT

In a motor control system of the present invention, a series circuit comprising a current sensing resistor, a DC motor and a power transistor, is connected between the output terminals of a DC power source; and a diode and a capacitor are connected to the series circuit. The diode is connected in parallel to the current sensing resistor and the DC motor, so that energy stored in the motor, corresponding to a drive current of the motor, is discharged through the current sensing resistor. The capacitor is connected in parallel to the DC motor and power transistor, so as to increase the power supplied to the motor when the load of the motor is momentarily increased. The current limiting circuit of the invention, enables the power supplied to the motor to be continued to be supplied when a momentary overload occurs, and to cause a limitation of the power supplied to the motor when the overload is for a longer period of time.

2 Claims, 2 Drawing Figures

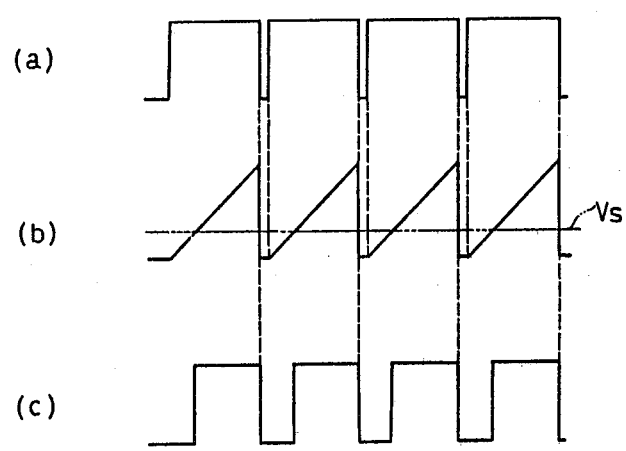

DC MOTOR CONTROL SYSTEM

BACKGROUND OF THE INVENTION

1. Field of Invention

This invention relates to a motor control system, and more particularly, to a DC motor speed control system having a simple current limiting circuit for limiting excess current to a DC motor from a DC power source.

2. Description of the Prior Art

In a conventional speed control system for a DC motor, wherein drive current to the DC motor is controlled by chopping signals, a current limiting circuit is provided in order to prevent the motor and DC power source from buring when excess current (or sometimes called overcurrent) flows continuously.

In such a prior current limiting circuit; however, disadvantageously, if a large load is momentarily applied to a DC motor during starting or driving, the current limiting circuit is caused to operate, and consequently, current above a predetermined value will not flow in the motor and torque of the motor cannot be increased during that time.

Moreover, in the conventional current limiting circuit, overcurrent to a motor is detected during conduction of a power control element, such as a power transistor. Since the overcurrent may vary near a predetermined limit value, a high frequency switching signal, in synchronization with the frequency of the current variation, is applied to the power transistor, by the current limiting circuit. However, the power transistor cannot respond accurately to the high frequency signal. Thus, overcurrent may flow in the motor continuously. As a result, current limitation is not reliably effected by the prior current limiting circuit and the motor and power transistor may be burned, or in certain circumstances, the power source transformer may also be burned.

Thus, the prior art DC motor control systems leave something to be desired, and improvement is greatly desired.

SUMMARY OF THE INVENTION

Accordingly, an object of the invention is to eliminate, reduce and/or overcome the aforementioned and other disadvantages and deficiencies of the prior art.

Thus, another object is to provide in a speed control system for controlling a DC motor, a current limiting circuit which can supply a relatively large current to the DC motor during a momentary overcurrent, thereby to increase the motor torque during the momentary overcurrent.

Another object is to provide in a speed control system for controlling a DC motor, a current limiting circuit which can protect the DC motor and power source from overcurrent during relatively long durations of overcurrent.

The foregoing and other objects are attain in the invention, which encompasses a series circuit comprising, in order, a current sensing resistor, a DC motor and a power transistor, which is connected between the positive and negative terminals of a DC power source, and a current limiting circuit which responds to an output signal from the current sensing resistor and reacts to inhibit the supply of turn on signals to the power transistor. The current sensing resistor detects current from the DC power source to the DC motor when the power transistor is turned on, and detects an induced current, based on energy discharged from the motor and corresponding to drive current of the motor, when the power transistor is turned off.

A capacitor is connected in a manner to help the power supply applied to the DC motor, when the load of the motor is momentarily increased. During that time, power is supplied to the motor by the capacitor and the power source. Thus, momentary increase of load, can be overcome. On the other hand, when overload is applied to the motor for a considerably longer period of time, the current sensing resistor, detects current above a predetermined value supplied only by the power source and interrupts the power transistor.

During the interruption of the power transistor, the current sensing resistor detects an induced current, based on the discharging of energy corresponding to the drive current supplied to the DC motor by the DC power source and the capacitor. The value of the detected current is greater than the value of current supplied to the motor by the power source through the current sensing resistor, when the power transistor is turned on during the overload condition. As a result, the current limiting circuit holds the power transistor in an interrupted state for a considerably long period of time, such as sufficient period of time during which there is an overload. Accordingly, the supply of high frequency switching signals to the power transistor can be inhibited securely.

As described, when a momentary increase of load on the motor occurs, the current limiting action is not effected and power supply to the motor is continued so that sufficient torque to drive the increased load, can be produced in the motor. When excess load occurs, the power supply to the DC motor is interrupted by the current limiting circuit. Consequently, the motor, the power transistor and the power source circuit with transformer can be protected. Furthermore, according to this invention, current supplied to the motor by the power source is detected during conduction of the power transistor, and the induced current of the motor is detected during interruption of the power transistor. Thus, the value of the detected current is equalized. In response to the equalized value, the power transistor is securely interrupted and current limiting is effected.

BRIEF DESCRIPTION OF THE DRAWINGS

FIG. 2 depicts waveforms of output voltages of the oscillator, capacitor and comparator, respectively, as produced in the embodiment of FIG. 1.

DETAILED DESCRIPTION OF PREFERRED EMBODIMENTS

Figure 1:
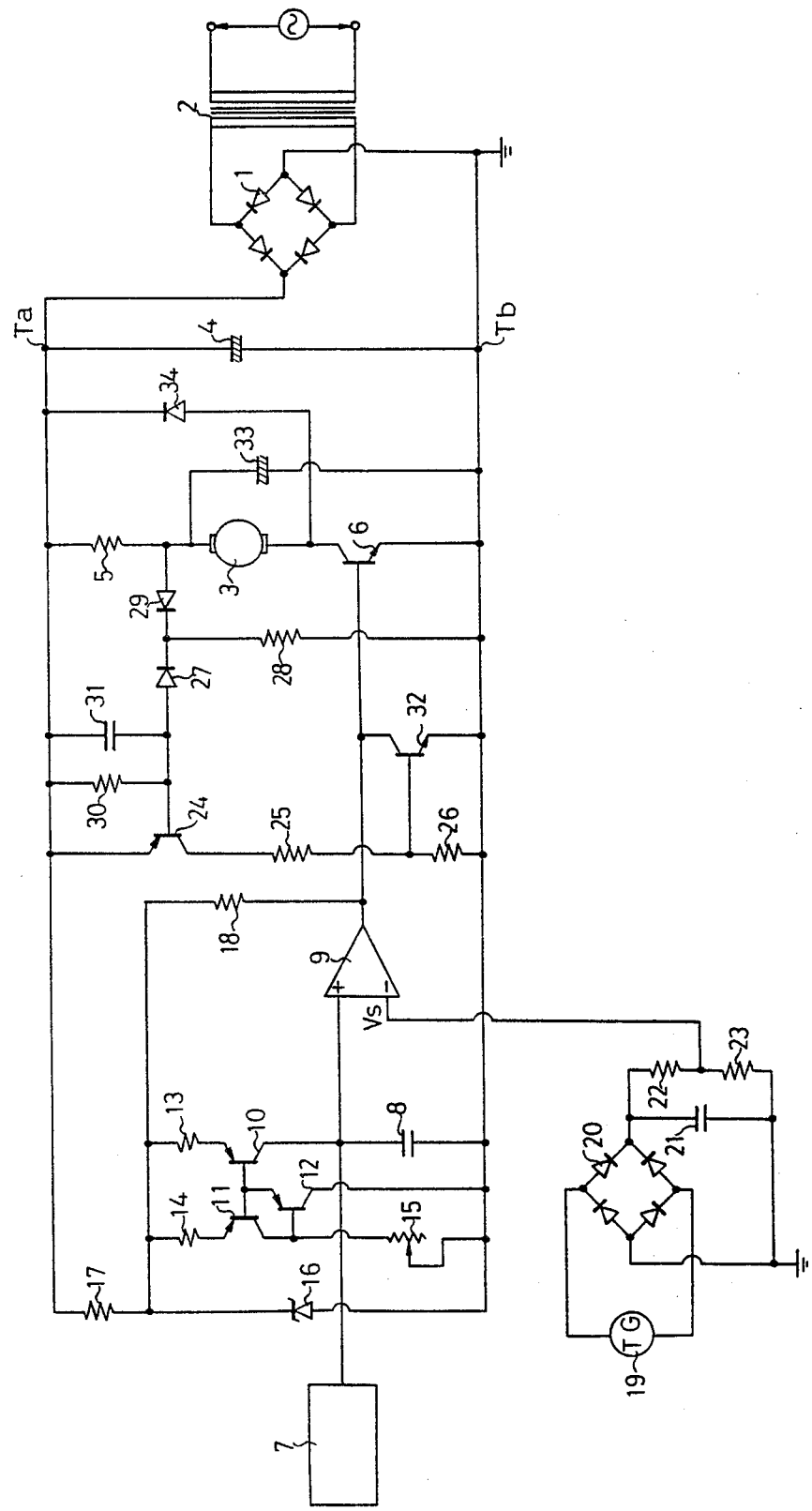
FIG. 1 depicts a schematic diagram of an illustrative embodiment of the invention.

Turning now to the drawings, in FIG. 1, there is depicted a full wave rectifier 1, which receives AC power from a transformer 2 and rectifies it into and forms a DC power source which supplies DC power to a DC motor 3. A smoothing capacitor 4 is connected between positive terminal Ta and zero potential terminal (negative terminal) Tb, of the full wave rectifier 1 and smooths the DC power source.

DC motor 3 has one end thereof connected, through a current sensing resistor 5, to positive terminal Ta; and has the other end thereof connected, through a power transistor 6, to zero potential terminal Tb. Current, supplied to motor 3, is detected by current sensing resistor 5, and the power supply to motor 3 is controlled by the hereinafter described switching operation of power transistor 6.

An oscillator 7, which is connected to one terminal of capacitor 8 and to the positive input terminal of comparator 9, as depicted, generates a square wave pulse voltage, such as shown in FIG. 2(a), at for example, a frequency of 20 KHz. A capacitor 8 is charged through a current mirror circuit comprising transistors 10, 11, 12; resistors 13,14; and a speed setting variable resistor 15. The charging wave form of capacitor 8 varies depending on the resistance set value of speed setting variable resistor 15. Discharge of capacitor 8 is effected suddenly, by a pulse voltage of low value from oscillator 7. Thus, at capacitor 8, a swatooth wave voltage, such as shown in FIG. 2(b), is generated, at, for example, 20 KHz. A Zener diode 16 has one end thereof connected, through a resistor 17, to positive terminal Ta; and has the other end thereof connected, to zero potential terminal Tb; and supplies a constant voltage to the current mirror circuit; and also supplies a constant voltage to the output terminal of a comparator 9, through resistor 18.

A tacho-generator 19 is connected operatively to DC motor 3 and generates an alternating current voltage having a frequency proportional to the revolution (i.e. rotary) speed of motor 3; and supplies the AC voltage to a full wave rectifier 20. The AC voltage is rectified by full wave rectifier 20 and is then smoothed by a smoothing capacitor 21, thereby converting the AC voltage into DC voltage with a value proportional to the rotary speed (eg RPM) of motor 3. Resistors 22 and 23 comprise a potential divider to divide the DC voltage. The voltage between both terminals of resistor 23 is the output signal which is supplied as a speed voltage Vs to the inverting input terminal of comparator 9. Accordingly, speed voltage Vs varies corresponding to the revolution speed of motor 3.

Comparator 9 compares the sawtooth wave voltage with speed voltage Vs. As seen in FIG. 2(c) when the sawtooth wave voltage is greater than the speed voltage Vs, a positive voltage for turning on power transistor 6 is applied to the base of power transistor 6. When the sawtooth wave voltage is less than the speed voltage Vs, zero voltage is applied to the base of power transistor 6. Thus, pulse width T1 of the output voltage from comparator 9 becomes short when the actual rotary speed of motor 3 is greater than a desired speed set by speed setting variable resistor 15; and the pulse width T1 becomes long when the actual speed is less than the desired speed. In this circuit configuration, turn on time of power transistor 6 (i.e. time power is supplied to the DC motor 3) is controlled, and the speed of motor 3 is controlled to and at a desired speed.

A transistor 24 has its emitter connected to positive terminal Ta, and its collector connected, through resistors 25,26, to zero potential terminal Tb; and its base connected, through a noise eliminating diode 27 and a resistor 28, to zero potential terminal Tb. A diode 29 is interposed between the cathode of diode 27 and the junction of current sensing resistor 5 and DC motor 3. Current in resistor 5 is bypassed through diode 29. Thus, transistor 27 is turned on, when current above a predetermined value (i.e. overcurrent) flow through current sensing resistor 5. A resistor 30 and a capacitor 31 are connected between the base and the emitter of transistor 24 and functions to eliminate noise.

A transistor 32 has its base connected between resistors 25 and 26; its collector connected to the base of power transistor 6 and its emitter connected to zero potential terminal Tb. Transistor 32 is turned on when transistor 24 is turned on. Thus, when transistor 32 is turned on, output voltage from comparator 9 is grounded through transistor 32, and power transistor 6 is not turned on even when a positive potential is produced at the output terminal of comparator 9.

A capacitor 33 is connected across a series circuit comprising DC motor 3 and power transistor 6. When motor 3 is overloaded, charge in capacitor 33 (i.e. backup power) is supplied to motor 3. A free wheeling diode 34 is connected across a series circuit comprising current sensing resistor 5 and DC motor 3. Thus, current in motor 3 is returned to current sensing resistor 5, when power transistor 6 is turned off.

The illustrative embodiment is operable in the following manner. When power is supplied to the embodiment, capacitors 4 and 33 are charged. If DC motor 3 is at rest, the resistance value of the speed setting variable resistor 15 is large and transistors 10 and 11 and 12 are turned off, so that the voltage between the terminals of capacitor 8 is zero. The output voltage of comparator 9 is set to zero potential by a bias circuit (not shown) and keeps power transistor 6 off.

If the resistance value of speed setting variable resistor 15 is decreased gradually and set to a predetermined value in order to start DC motor 3, power transistor 6 is turned on and off repeatedly at a corresponding duty cycle. While power transistor 6 is on, motor 3 is supplied with a drive current from both capacitors 4 and 33, and current sensing resistor 5 detects current supplied to motor 3 by capacitor 4. While power transistor 6 is off, the energy stored in motor 3, corresponding to the drive current supplied to motor 3 (i.e. the induced current) is discharged through free wheeling diode 34 and current sensing resistor 5. Thus, the current sensing resistor 5 detects the sum value of the induced current and the charging current supplied to capacitor 33. In order to prevent transistor 24 from being turned on by a voltage drop across current sensing resistor 5 while motor 3 is started at normal condition, the value of the resistor 5 and other circuit elements are set a suitable value.

If the load of motor 5, which is being drive at a set speed, is increased momentarily, and the speed of motor 3 is decreased, power transistor 6 remains in its conductive state continuously, in order to enable the recovery of the motor speed to a set value. Consequently, the drive current supplied to motor 3 by both capacitors 4 and 33, is increased. In this case, since current sensing resistor 5 detects current supplied only by capacitor 4 to motor 3, transistor 24 is not turned on by a voltage drop across resistor 5 and power transistor 6 is not turned off by the current limiting circuit including transistor 32. DC motor 3 is supplied with a drive current by both capacitors 4 and 33 continuously and produces sufficient torque to drive the increased load. In this manner, the speed of motor 3 is recovered to a set speed and then the drive current from both capacitors 4 and 33 is decreased to a normal value. Since during momentary increase of load, electric power to the motor is supplied, not only from the DC power source including capacitor 4, but also from backup capacitor 33, and the current limiting circuit does not act in response to the momentary increase of load, motor 3 can be supplied with power by power transistor 6 continuously and drive the increased load.

If the motor 3 falls into a locked condition due to excess load, power transistor 6 is turned on continuously and motor 3 is supplied with a drive current by both capacitors 4 and 33. The voltage between terminals of capacitor 33, is decreased on account of the excess load and motor 3 is supplied with current by the DC power source, including capacitor 4, through current sensing resistor 5, and the supplied current is rapidly increased. When the current supplied to motor 3 by capacitor 4 attains a predetermined limit, transistor 24 is turned on and transistor 32 is supplied with a base current and shunts between the base and emitter of power transistor 6. If power transistor 6 is turned off, the sum value of the discharging current (i.e. induced current) of energy stored in motor 3 and the charging current of capacitor 33, is detected by current sensing resistor 5. Since the sum value is greater than the value of the current supplied to motor 3 by capacitor 4, while power transistor 6 is turned on, transistor 24 is turned on continuously by voltage drop across current sensing resistor 5, and power transistor 6 remains in its non-conductive state until the sum value is decreased to a smaller value than the predetermined current limit. Power supplied to motor 3 is interrupted for a relatively long period of time of excess load, until the sum value becomes smaller than the predetermined current limit. If the excess load is removed during power interruption, the motor may be driven again to a normal condition.

Although the present invention has been described in a preferred embodiment, it is understood that modifications may be effected in various ways without departing from the spirit and scope of the invention. For example, without limitation, in place of the power transistor 6 used in the switching operation, another transistor may be operated in active state for speed control of the motor 3.

What is claimed is:

1. A motor control system for controlling the drive current to be supplied to a motor from a direct current source through a power transistor, comprising
   a circuit for connecting said power transistor in series circuit with said motor, between positive and negative terminals of said source, said power transistor being connected between a terminal of said motor and said negative terminal of said source;
   a current sensing resistor connected between said positive terminal of said source and another terminal of said motor, for generating a current sensing signal proportional to the drive current supplied to said motor;
   a free wheeling diode connected across a series circuit, including said current sensing resistor and said motor, for providing a current discharge path for the induced current of said motor when said power transistor is in a non-conductive state;
   a capacitor connected across a series circuit including said motor and said power transistor for supplementing the said drive current to said motor; and
   a current limiting circuit for rendering said power transistor non-conductive when the magnitude of said current sensing signal exceeds a predetermined value.

2. The system of claim 1, wherein said current limiting circuit includes a transistor connected between the base and emitter of said power transistor and operative to inhibit the supply of a drive control signal to said power transistor.

* * * * *